US012687622B2

(12) United States Patent
Zoe Du et al.

(10) Patent No.: US 12,687,622 B2
(45) Date of Patent: Jul. 21, 2026

(54) METHODS AND APPARATUS FOR VALIDATION OF INTRINSIC PARAMETERS FOR LIDAR

(71) Applicant: Nuro, Inc., Mountain View, CA (US)

(72) Inventors: Jingwen Zoe Du, Mountain View, CA (US); Yang Han, Sunnyvale, CA (US); Laszlo Peter Berczi, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 655 days.

(21) Appl. No.: 18/297,332

(22) Filed: Apr. 7, 2023

(65) Prior Publication Data

US 2023/0350037 A1 Nov. 2, 2023

Related U.S. Application Data

(60) Provisional application No. 63/336,764, filed on Apr. 29, 2022.

(51) Int. Cl.
| | |
|---|---|
| *G01S 7/497* | (2006.01) |
| *G01S 7/481* | (2006.01) |
| *G01S 17/89* | (2020.01) |
| *G01S 17/931* | (2020.01) |

(52) U.S. Cl.
CPC ............ *G01S 7/497* (2013.01); *G01S 7/4817* (2013.01); *G01S 17/89* (2013.01); *G01S 17/931* (2020.01)

(58) Field of Classification Search
CPC ........ G01S 7/497; G01S 7/4817; G01S 17/89; G01S 17/931; G01S 17/42
See application file for complete search history.

(56) References Cited

U.S. PATENT DOCUMENTS

| | | | |
|---|---|---|---|
| 8,368,876 B1 * | 2/2013 | Johnson | G01S 17/89 356/3.01 |
| 9,134,402 B2 * | 9/2015 | Sebastian | G01S 7/4972 |
| 9,933,515 B2 | 4/2018 | Prokhorov | |
| 9,952,317 B2 * | 4/2018 | Valois | G01S 7/497 |
| 10,718,856 B2 | 7/2020 | Valois et al. | |

(Continued)

FOREIGN PATENT DOCUMENTS

| | | | |
|---|---|---|---|
| WO | WO-2021051439 A1 * | 3/2021 | G01S 7/497 |
| WO | 2021211585 A2 | 10/2021 | |
| WO | WO-2021231837 A2 * | 11/2021 | G01S 17/931 |

*Primary Examiner* — Fernando Alcon
(74) *Attorney, Agent, or Firm* — Edell, Shapiro & Finnan, LLC

(57) ABSTRACT

According to one aspect, a method includes positioning a lidar on a platform, measuring at least a first data point using the lidar, measuring at least a second data point using the lidar, processing the at least first data point and the at least second data point to identify a first estimated location of the vertex, and determining whether the first estimated location of the vertex meets the specification, wherein when it is determined that the first estimated location of the vertex meets at least one specification associated with the lidar, the lidar is verified. The platform rotates about a first axis, wherein when the platform rotates about the first axis, the lidar rotates about the first axis. The data points measured with respect to a target, the target having at least a first edge, a second edge, and a vertex at which the first edge meets the second edge.

20 Claims, 14 Drawing Sheets

550 ⌐

(56) References Cited

U.S. PATENT DOCUMENTS

| | | | | |
|---|---|---|---|---|
| 11,609,315 | B2 | 3/2023 | Rohatgi et al. | |
| 12,422,535 | B2* | 9/2025 | Kim | G01S 7/497 |
| 2017/0124781 | A1 | 5/2017 | Douillard et al. | |
| 2019/0056483 | A1* | 2/2019 | Bradley | G01S 7/4815 |
| 2019/0056484 | A1* | 2/2019 | Bradley | G01S 7/4815 |
| 2020/0130188 | A1 | 4/2020 | Lawrence et al. | |
| 2020/0158840 | A1* | 5/2020 | Ikram | G06T 7/80 |
| 2021/0134079 | A1* | 5/2021 | Nee | B65G 47/80 |
| 2021/0316669 | A1* | 10/2021 | Wang | G01S 13/862 |
| 2022/0120867 | A1* | 4/2022 | Liang | G01S 7/4815 |
| 2022/0309835 | A1* | 9/2022 | Hu | G06T 7/246 |
| 2022/0365186 | A1* | 11/2022 | Schwiesow | G01S 7/497 |
| 2023/0150519 | A1* | 5/2023 | Kobetz | G01S 7/4972 |
| | | | | 701/23 |
| 2023/0161008 | A1* | 5/2023 | Sachkov | G01S 17/931 |
| | | | | 356/4.01 |
| 2023/0182766 | A1* | 6/2023 | Chou | G01S 7/52004 |
| | | | | 701/23 |
| 2023/0194676 | A1* | 6/2023 | Kapsenberg | H04B 10/697 |
| | | | | 356/5.01 |
| 2023/0251363 | A1* | 8/2023 | Ren | G06T 7/33 |
| | | | | 356/4.02 |
| 2024/0069175 | A1* | 2/2024 | Sterling | G01S 7/497 |
| 2024/0201347 | A1* | 6/2024 | Garza Fernandez | G01S 7/4814 |
| 2024/0371035 | A1* | 11/2024 | Jadhav | G01S 17/86 |
| 2026/0036686 | A1* | 2/2026 | Fan | G01S 7/497 |

* cited by examiner

550

LIDAR ~504

546a

546b

546n

TARGET ~550b

ARTICULATING PLATFORM ~550a

~550c

PROCESSOR ~552a

CONTROLLER ~552b

COMMUNICATIONS ARRANGEMENT ~552c

DATA COLLECTION ARRANGEMENT ~552d

DATA PROCESSING ARRANGEMENT ~552e

STORAGE ARRANGEMENT ~552f

VERIFICATION SYSTEM

650 ⟶

650 ⟶

METHODS AND APPARATUS FOR VALIDATION OF INTRINSIC PARAMETERS FOR LIDAR

PRIORITY CLAIM

This patent application claims the benefit of priority under 35 U.S.C. § 119 to U.S. Provisional Patent Application No. 63/336,764, filed Apr. 29, 2022, and entitled "Method and Apparatus for Validating Inter-Channel Accuracy Parameters of Lidars," which is incorporated herein by reference in its entirety.

TECHNICAL FIELD

The disclosure relates to providing systems which may be used to validate the accuracy of sensors used on autonomous vehicles. More specifically, the disclosure relates to a system which may be used to validate intrinsic parameters associated with lidar systems used on autonomous vehicles.

BACKGROUND

Autonomous vehicles rely on sensors to operate safely. Sensors such as lidars provide important information that is used by autonomy systems to enable a vehicle to operate autonomously and in a safe manner. If sensors which facilitate the operation of an autonomous vehicle do not operate with a relatively high degree of accuracy, the performance of the autonomous vehicle may be compromised. Therefore, to effectively ensure the ability of sensors such as lidars to operate at a level of accuracy that is expected, parameters specified by sensor manufacturers may be validated.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
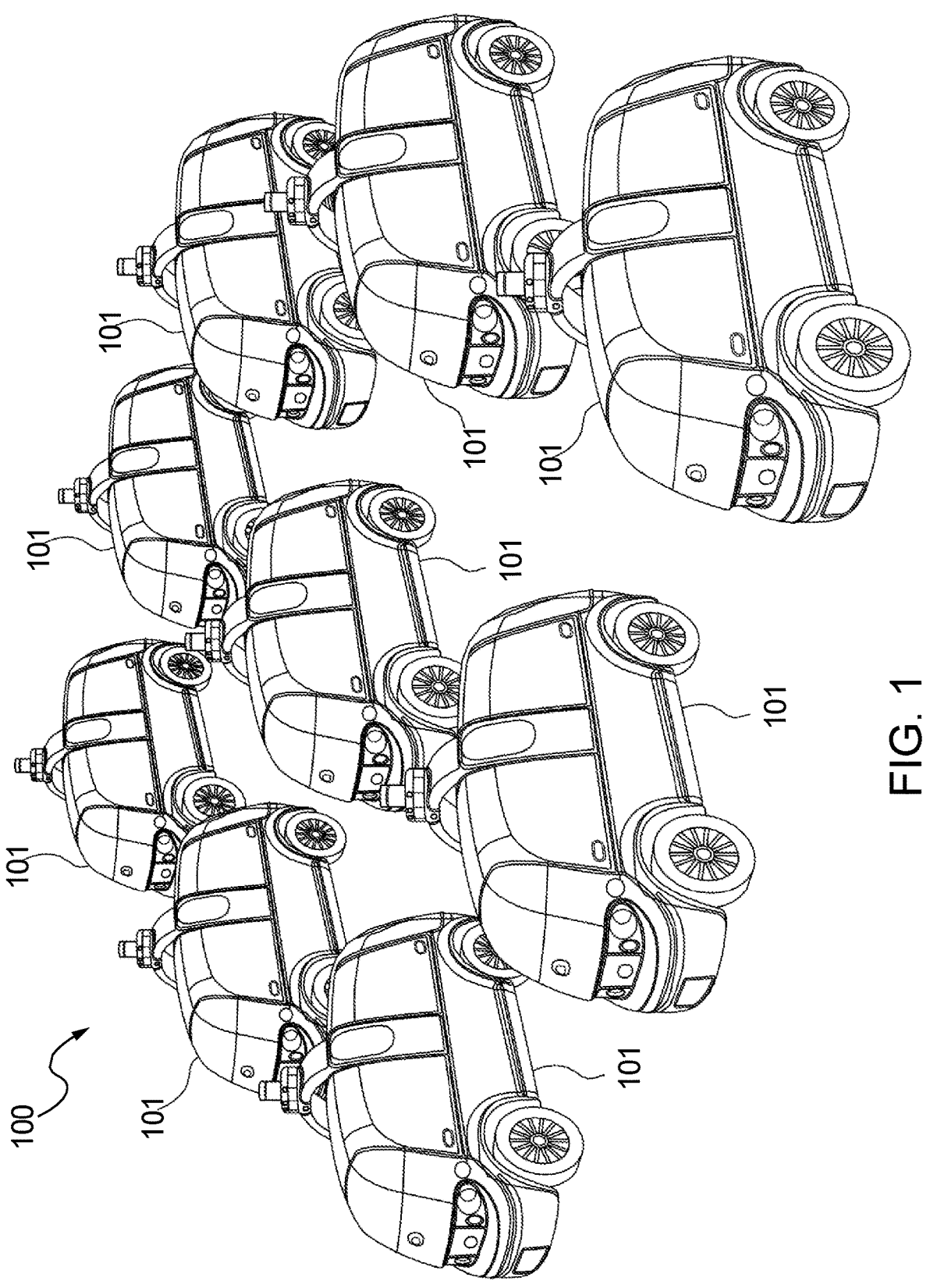
FIG. 1 is a diagrammatic representation of an autonomous vehicle fleet in accordance with an embodiment.

According to one embodiment, a method includes positioning a lidar on a platform, measuring at least a first data point using the lidar, measuring at least a second data point using the lidar, processing the at least first data point and the at least second data point to identify a first estimated location of the vertex, and determining whether the first estimated location of the vertex meets at least one specification associated with the lidar, wherein when it is determined that the first estimated location of the vertex meets the specification, the lidar is verified. The platform is arranged to rotate about a first axis, wherein when the platform rotates about the first axis, the lidar rotates about the first axis. The at least first data point is associated with a first channel of the lidar when the platform is oriented at a first pitch angle, wherein the at least first data point is measured with respect to a target, the target having at least a first edge, a second edge, and a vertex at which the first edge meets the second edge. The at least second data point is associated with the first channel of the lidar when the platform is oriented at a second pitch angle, wherein the at least second data point is measured with respect to the target.

In accordance with another embodiment, logic is encoded in one or more tangible non-transitory, computer-readable media for execution and when executed is operable to measure at least a first data point, the at least first data point being associated with a first channel of a lidar positioned on a platform that is oriented at a first pitch angle, wherein the at least first data point is measured with respect to a target, the target having at least a first edge, a second edge, and a vertex at which the first edge meets the second edge, The logic is also operable to measure at least a second data point, the at least second data point being associated with the first channel of the lidar when the platform is oriented at a second pitch angle, wherein the at least second data point is measured with respect to the target. In addition, the logic is operable to process the at least first data point and the at least second data point to identify a first estimated location of the vertex and to determine whether the first estimated location of the vertex meets the specification, wherein when it is determined that the first estimated location of the vertex meets the specification, the lidar is identified as verified.

In accordance with yet another embodiment, an apparatus includes a platform, a target, and a verification system. The platform is configured to support a lidar and to rotate about a first axis. The target is positioned at a distance away from the platform, the target including a first edge, a second edge, and a vertex, the vertex being defined as a point at which the first edge and the second edge meet. The verification system is configured to process measurements obtained from the lidar supported by the platform with respect to the verification system for each channel of a plurality of channels associated with the lidar. The verification system is further configured to process the measurements to obtain at least one estimated parameter for the lidar and to determine whether, based at least on the at least one estimated parameter, the channel meets a channel accuracy metric.

A method for verifying the accuracy of channels or beams of a lidar that may be used on an autonomous vehicle utilizes an articulating platform that is configured to rotate with a lidar situated thereupon such that beams emitted by the lidar come into contact with a target that is placed at a distance from the lidar. The target includes edges that essentially join at a vertex. Using data points collected using the lidar and the target at different pitch angles for the platform, intrinsic parameters of the lidar may be estimated from the location of a target vertex for each channel or beam associated with the lidar. A determination may then be made as to whether the location of the vertex is estimated within an acceptable, or otherwise desirable, range for each channel. That is, the accuracy with which the location or position of the vertex is estimated for each channel of a lidar may be used to determine whether the lidar is capable of performing as expected.

Description

Autonomous vehicles are often configured to include multiple sensors which are arranged to collect data that is used by autonomy systems to enable the autonomous vehicle to operate safely. Sensors mounted on an autonomous vehicle include, but are not limited to including, lidars. In order for an autonomous vehicle to perform to a desired level, sensors such as lidars may be expected to meet performance specifications identified by manufacturers of the sensors. Parameters relating to channels or beams of a lidar may be expected to be within a particular range that is specified by a manufacturer or vendor of the lidar.

To verify the accuracy of sensors, e.g., to verify whether parameters associated with a lidar fall within a specified or expected range of values, used with autonomous vehicles or fleets of autonomous vehicles, an enterprise which builds, utilizes, and/or manages the deployment of the autonomous vehicles may assess the accuracy of the sensors. A lidar may be assessed, prior to being mounted on a vehicle, to determine whether each channel or beam of the lidar meets performance expectations. By assessing the inter-channel accuracy of a lidar, parameters specified by a manufacturer or vendor may be verified. When the specified parameters are verified, and the lidar is determined to be performing at an expected level of performance, the lidar may be identified as adequate for enabling an autonomous vehicle to operate safely.

Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
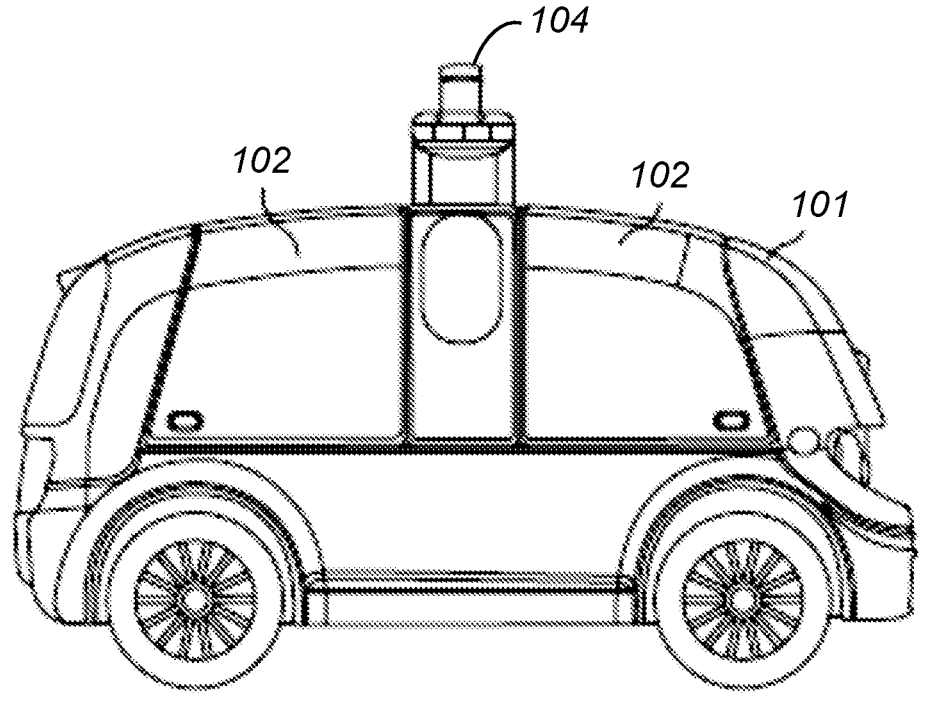
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102 and at least one rotational or spinning lidar 104. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
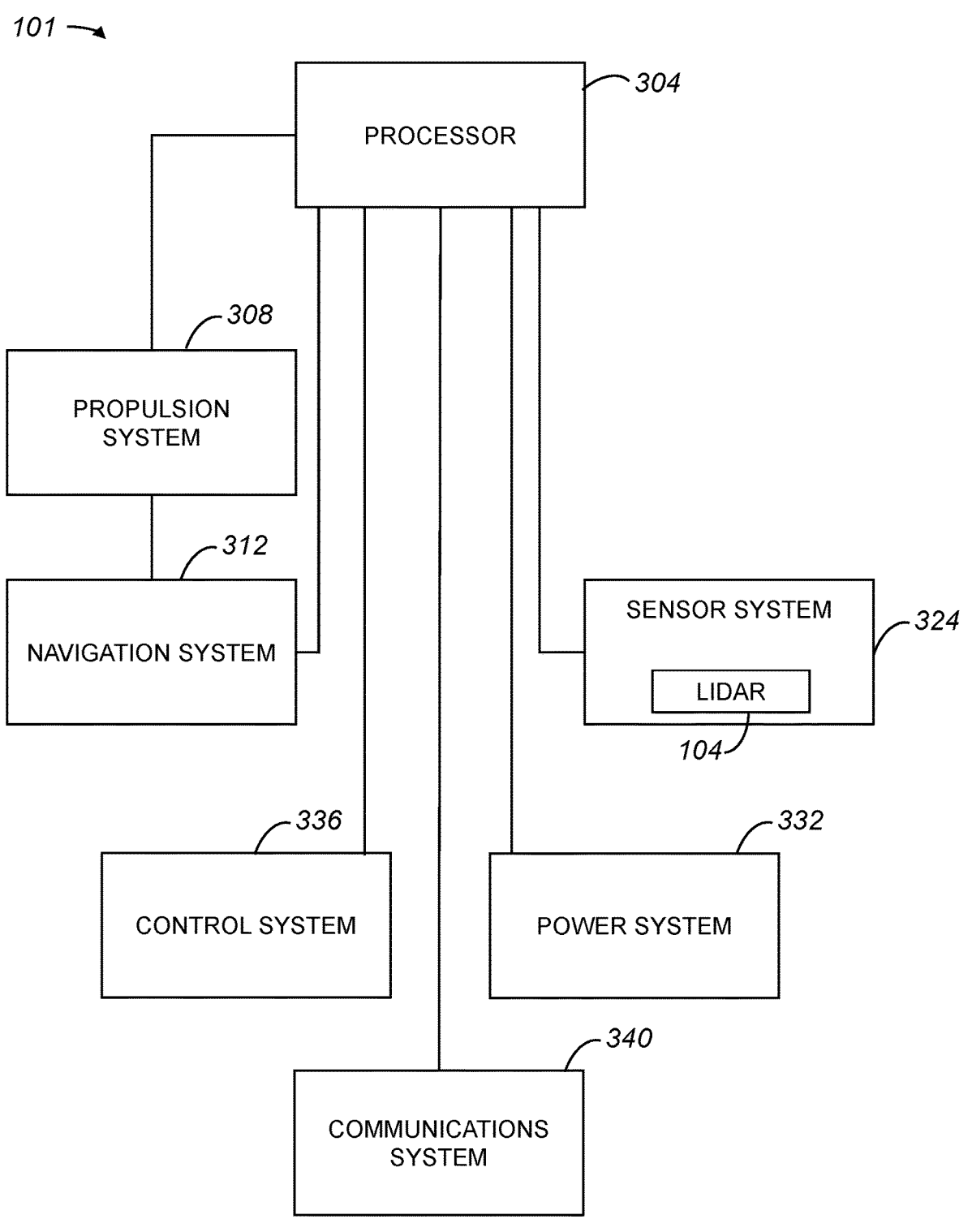
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example at least one lidar 104, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion system sensors that monitor drive mechanism performance, drive train performance, and/or power system levels. Data collected by sensor system 324 may be used by a perception system associated with navigation system 312 to determine or to otherwise understand an environment around autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

A lidar such as lidar 104 has intrinsic parameters associated with beams or channels that are to be validated, or otherwise assessed, for accuracy. A lidar may be a mechanical lidar that includes rotational or spinning capabilities. In one embodiment, a lidar may include approximately sixty-four beams or channels, although it should be appreciated that the number of beams or channels associated with a lidar may vary. As will be appreciated by those skilled in the art, a rotating or spinning lidar is configured to rotate or spin about an axis, e.g., a vertical axis, to capture an approximately 360 degree field of view. When such a rotating lidar is positioned on a vehicle, the rotating lidar may provide a relatively comprehensive image of the environment around the vehicle.

Figure 4:
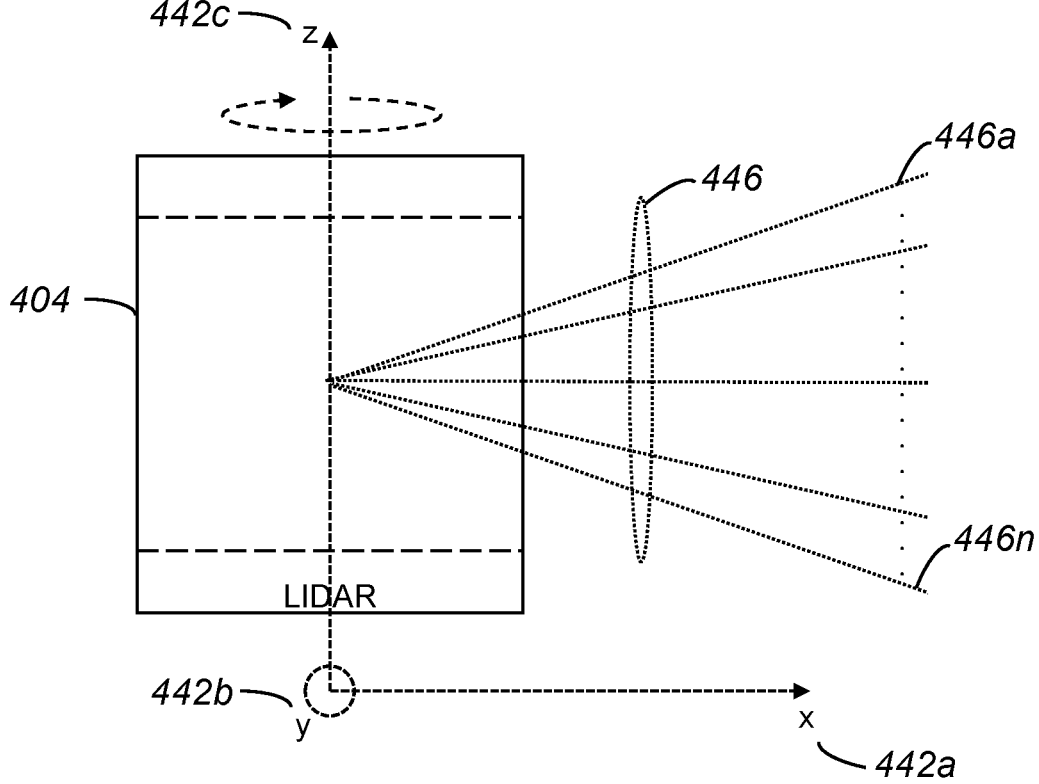
FIG. 4 is a diagrammatic representation of a beam or channel distribution pattern of a lidar in accordance with an embodiment.

FIG. 4 is a diagrammatic representation of a beam or channel distribution pattern of a rotating lidar in accordance with an embodiment. A lidar 404 is configured to be positioned such that beams or channels 446 emitted by lidar 404 may rotate or spin with respect to a z-axis 442c of a coordinate axis that also includes an x-axis 442a and a y-axis 442b. Beams 446 may include any number of beams 446a-n. In one embodiment, beams 446 may include up to approximately sixty-four beams 446a-n.

Lidar 404 may be used as a long-range lidar mounted on a top surface of an autonomous vehicle, e.g., similar to lidar 104 of FIG. 2. Lidar 404 is not limited to being used as a long range lidar, and may instead be used as a short-range lidar mounted, for example, on a front, a side, and/or a rear of an autonomous vehicle. A long-range lidar may be arranged to collect information that relates to objects in a range of detection that is at a distance away from an autonomous vehicle, while a short-range lidar may be arranged to collect information that relates to objects which are near the autonomous vehicle.

In general, when lidar 404 is operating, components in lidar 404 may rotate or spin about an elevation axis of lidar 404, e.g., z-axis 442*c*. The components may rotate in either a clockwise direction or a counterclockwise direction. As components within lidar 404 rotate, data is obtained or otherwise captured by lidar 404 that relates to objects within a range of detection of lidar 404. The data may include information used to generate a point cloud. A field of view that may effectively be covered by lidar 404, as components within lidar 404 rotate, is up to approximately 360 degrees in an xy, or horizontal, plane defined by x-axis 442*a* and y-axis 442*b*.

As shown, beams 446 are arranged to be dispersed in a z-direction or relative to z-axis 442*c*. For ease of illustrations, illustrative beams 446*a-n* may correspond to beams having elevations, or offset angles with a plane defined by x-axis 442*a* and y-axis 442*b*. Each beam 446*a-n* may correspond to different elevations, e.g., channel 446*a* may have an elevation of approximately +25 degrees while channel 446*n* may have an elevation of approximately −25 degrees. The distribution of beams 446*a-n* may be an even distribution across all beams 446*a-n*, or the distribution of beams 446*a-n* may effectively be unevenly distributed, as for example such that beams 446*a-n* may be more concentrated in an approximately ±10 degree range.

Due to manufacturing imperfections and/or tolerances, a designed or expected beam or channel distribution pattern of lidar 404 may deviate. That is, a manufacturing and/or assembly process for lidar 404 may include imperfections that effectively introduce unintended or undesigned offsets into the actual beam or channel distribution pattern of lidar 404. Lidar 404 may have specifications which identify accuracy tolerances of individual beams 446*a-n* generated by lidar 404. By way of example, a lidar manufacturer may specify that each of the beams or channels 446*a-n* may have a maximum of approximately ±0.3 degrees of a vertical offset from a desired elevation relative to z-axis 442*c*. In the described embodiment, z-axis 442*c* may be an elevation axis, as z-axis 442 is the axis about which components within lidar 404 may rotate or spin.

Beam or channel 446*a* may have an elevation that is expected to be approximately +25 degrees relative to a plane defined by x-axis 442*a* and y-axis 442*b*. In one embodiment, if lidar 404 performs as expected, e.g., as specified by a manufacturer, the elevation of beam or channel 446*a* may have a horizontal offset of between approximately +25.3 degrees and approximately +24.7 degrees. The manufacturer may substantially specify that each beam or channel 446*a-n* may have a maximum of an approximately ±0.3-degree horizontal offset.

The ability to validate or to verify the accuracy of intrinsic parameters such as elevations of beams or channels associated with a lidar enables an autonomous vehicle on which the lidar is mounted to operate safely, as previously mentioned. The measurement and, hence, validation of beam or channel accuracy parameters may be accomplished using a testing system that includes an articulating platform on which a lidar may be mounted, as well as a target placed at a distance from the articulating platform.

Figure 5:
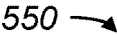
FIG. 5 is a block diagram representation of a beam or channel verification system in accordance with an embodiment.

FIG. 5 is a block diagram representation of a beam or channel verification system, or a validation apparatus that is configured to measure and to validate beam or channel accuracy parameters of a lidar, in accordance with an embodiment. A verification system 550 includes an articulating platform 550*a* on which a lidar 504 with a distribution of beams or channels 536*a-n* that is to be validated is mounted. It should be appreciated that while three beams

546*a-n* are shown for ease of illustration, the number of beams 546*a-n* may vary widely. In one embodiment, lidar 504 may have a distribution of approximately sixty-four beams 546*a-n*. Articulating platform 550*a* may be configured to rotate about a first axis, e.g., a vertical axis, and to cause lidar 504 to rotate about the axis. In one embodiment, articulating platform 550*a* may alternatively or additionally pivot with respect to a second axis that is substantially perpendicular to the first axis, e.g., a horizontal axis.

Verification system 550 also includes a target 550*b* that beams 546*a-n* are expected to effectively project onto, and a verification system 550*c* that collects data as beams 546*a-n* are projected onto target 550*b* and processing the data to determine whether the distribution of beams 546*a-n* is verified as effectively meeting performance specifications or intrinsic parameters. Lidar 504 generally publishes data over the Ethernet as packets, and each packet may contain one or more measurements, The measurements may be substantially transformed into a collection of three-dimensional points, e.g., point cloud data, at various positions, and the data may be used to jointly validate intrinsic parameters.

Verification system 550*c* is generally arranged to control platform 550*a* and to process data obtained from lidar 540 and target 550*b* to substantially ascertain whether beams of channels associated with lidar 540 meet specifications. Verification system 550*c* includes a processor 552*a*, a controller 552*b*, a communications arrangement 552*c*, a data collection arrangement 552*d*, a data processing arrangement 552*e*, and a storage arrangement 552*f*. Processor 552*a* is generally configured to execute hardware and/or software logic that substantially provides the functionality associated with verification system 550*c*. Controller 552*b* is configured to control platform 550*a* to change pivot angles. That is, controller 552*b* is configured to control the movement, e.g., rotational movement, of platform 550*a*. Communications arrangement 552*c* is configured to enable verification system 550*c* to receive data and to send data, as for example on a network and/or over a substantially wired connection. Data collection arrangement 552*d* is arranged to obtain data associated with lidar 504 and target 550*b*. The data obtained by data collection arrangement 552*d* may include, but is not limited to including, point cloud data that is collected when lidar 504 projects beams onto target 550*b*. Data processing arrangement 552*e* is arranged to process the obtained data. In one embodiment, processing the data may include fitting lines through the obtained data such that one or more parameters associated with lidar 504 may be estimated. Storage arrangement 552*f* is arranged to store data including, but not limited to including, data obtained from lidar 504, data collected by data collection arrangement 552*d*, parameters estimated by data processing arrangement 552*e*, and/or information generally associated the performance of verification assessments.

Figure 6A:
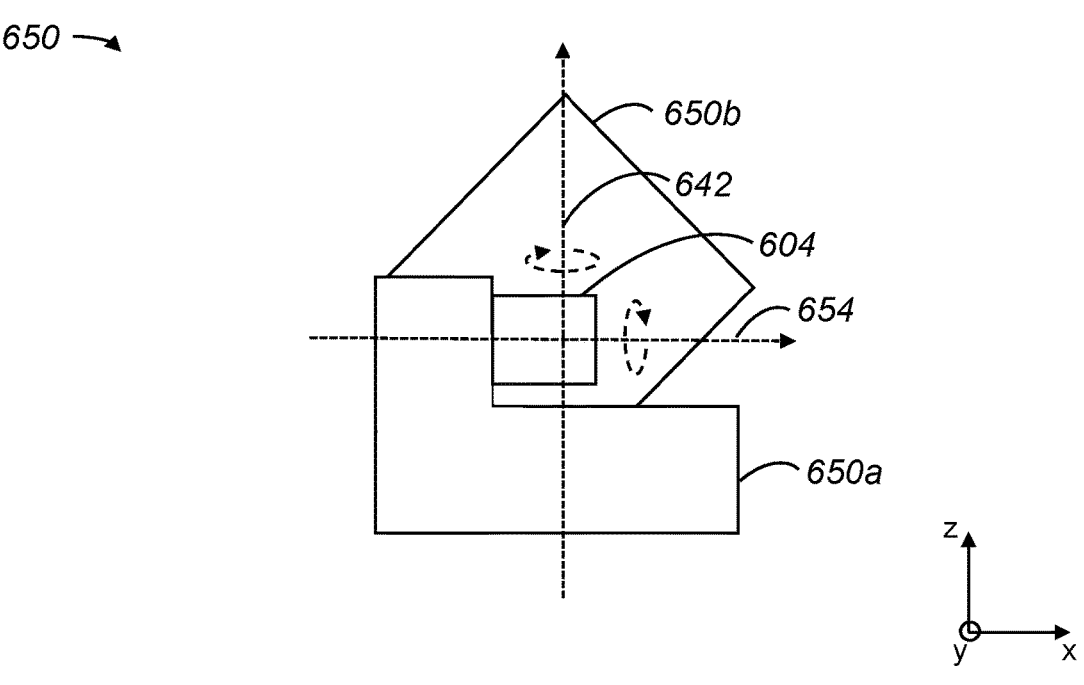
FIG. 6A is a diagrammatic first side view representation of a beam or channel verification system in accordance with an embodiment.
Figure 6B:
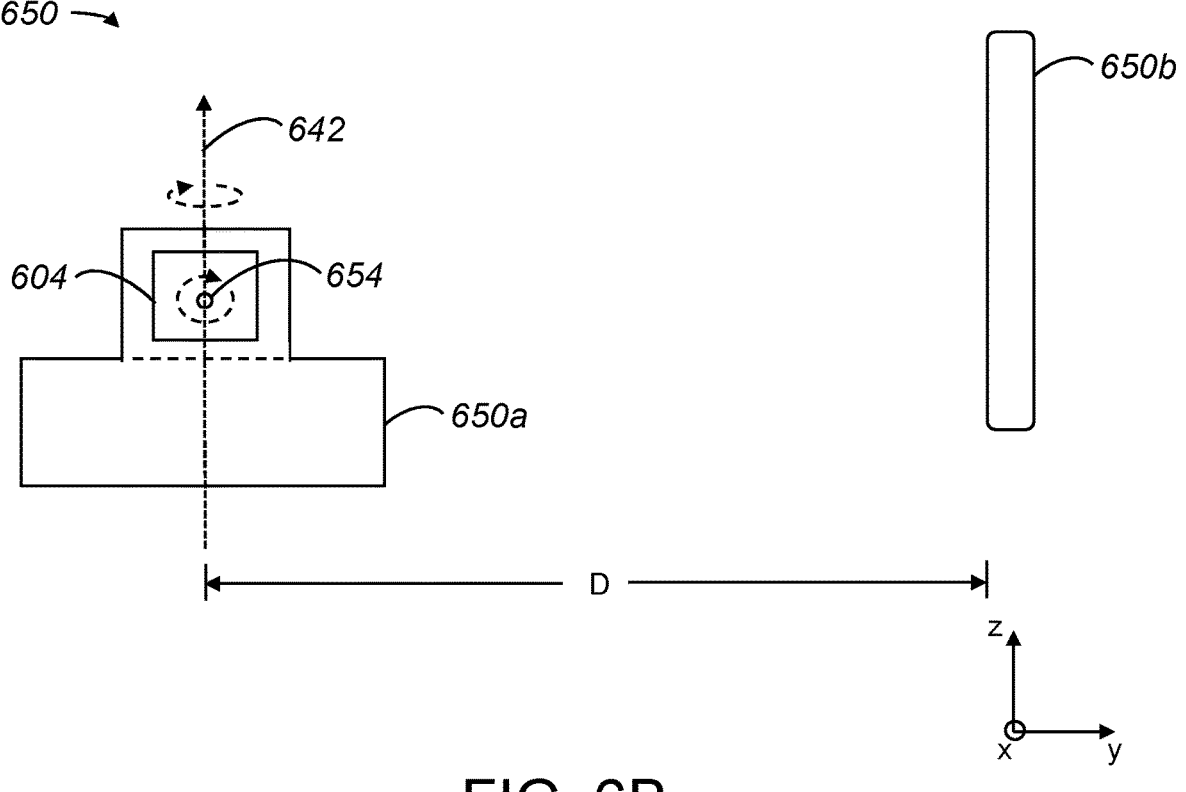
FIG. 6B is a diagrammatic second side view representation of a beam or channel verification system, e.g., beam or channel verification system 650 of FIG. 6A, in accordance with an embodiment.

With reference to FIGS. 6A and 6B, an example of a beam or channel verification system that is suitable for use in substantially validating an inter-beam or inter-channel accuracy of a lidar will be described in accordance with an embodiment. FIG. 6A is a first side view representation of a verification system 650, and FIG. 6B is a second side view representation of verification system 650. Verification system 650 includes an articulating platform 650*a*, a target 650*b*, and a lidar 604 carried on articulating platform 650*a*.

In one embodiment, platform 650*a* is configured to rotate or spin about a vertical axis or a z-axis 642. That is, platform 650*a* rotates to different pitch angles, and in the same direction as an elevation of lidar 604. The range of motion of platform 650*a* is up to approximately 360 degrees of rotation with respect to vertical axis 642. As platform 650*a* rotates about vertical axis 642, platform 650*a* causes lidar 604, which is coupled to platform 650*a*, to also rotate about vertical axis 642. As platform 650*a* and lidar 604 rotate about vertical axis 642, beams (not shown) emitted by lidar 604 may be projected onto or otherwise "hit" target 650*b*. Target 650*b* may generally be placed at any suitable distance 'D' away from platform 650*a* and, hence, lidar 604 relative to a y-direction or y-axis. Distance 'D' may vary, but may generally be in a range of between approximately two meters and approximately five meters. By way of example, to reduce interstitial points, or points between a target and a background which may arise if the target 650*b* and a background are relatively close together, distance 'D' may be in a range of between approximately three and approximately five meters, and a distance between target 650*b* and a background may be approximately one meter.

As shown, target 650*b* may have a diamond or square shape, although it should be appreciated that the shape and size of target 650*b* may vary. That is, target 650*b* is not limited to having an overall diamond or square shape. In addition, target 650*b* may either be substantially solid, or target 650*b* may have an empty or hollow center, as will be discussed below with reference to 7A and 7B.

Components within lidar 604 may be arranged to cause emitted beams to effectively rotate about an axis 654 which, in the described embodiment, is a substantially horizontal axis such as an x-axis. The rotational axis of lidar 604 is substantially orthogonal to a rotational axis of platform 650*a*. For example, axis 654 is oriented in the direction of the elevation of lidar 604. Axis 654 is an elevation axis with respect to an elevation of lidar 604. As shown, lidar 604 is mounted substantially sideways, and axis 654 is a horizontal axis. Axis 654 is substantially perpendicular to axis 642. The emitted beams may be projected from or otherwise emanate from lidar 604 as components within lidar 604 rotate about axis 654, as well as while the rotation of platform 650*a* about axis 642 causes lidar 604 to also rotate about axis 642.

The configuration of target 650*b* may vary. For example, the size, shape, composition, and/or color of target 6501) may vary depending upon factors including, but not limited to including, the requirements associated with validating the inter-beam or inter-channel accuracy of intrinsic parameters. In general, target 650*b* may be any shape that includes at least two edges and at least one vertex, or at least one point at which two edges may effectively join. The size of target 650*b* and the distance D of target 650*b* from lidar 640 may be determined based on, but are not limited to being based on, detection distance, channel elevation angles, resolution, and the like.

Figure 7A:
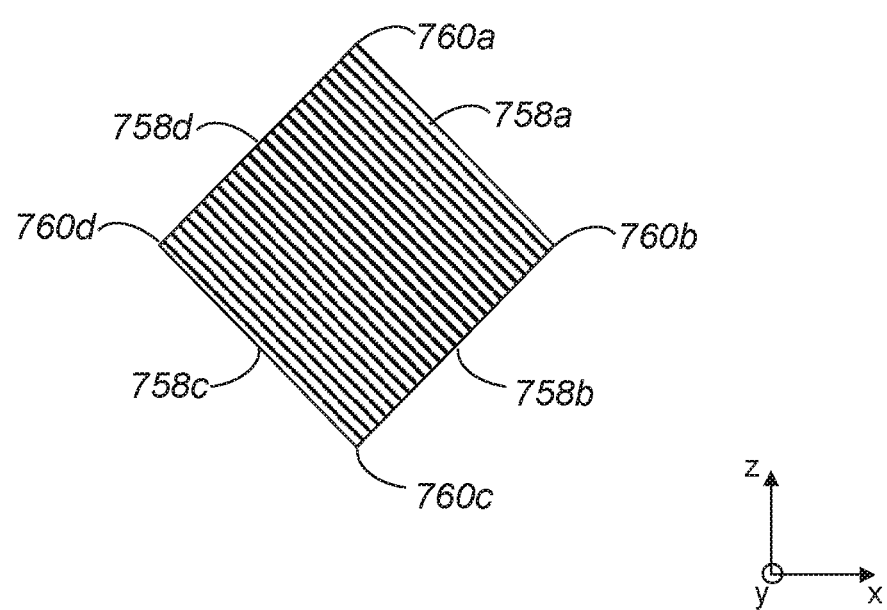
FIG. 7A is a diagrammatic representation of a first configuration of a target, e.g., target 650b of FIGS. 6A and 6B, in accordance with an embodiment.

FIG. 7A is a diagrammatic representation of a first configuration of target 650*b* of FIGS. 6A and 6B in accordance with an embodiment. Target 650*b'* has a polygonal shape, e.g., a substantially diamond shape, and is solid relative to an xz-plane. Target 650*b'* may be formed from any suitable material, as for example foam core or a relatively thick foam effectively sandwiched between sheets of card stock. In general, target 650*b'* may be formed from substantially any material which enables lidar returns. As shown, target 650*b'* includes outer edges 758*a-d* and vertices 760*a-d* that are created where outer edges 758*a-d* effectively intersect, meet, or otherwise join together. In one embodiment, the length of each edge 758*a-d* may be approximately four feet, although it should be understood that the length of each edge 758*a-d* may vary widely.

Figure 7B:
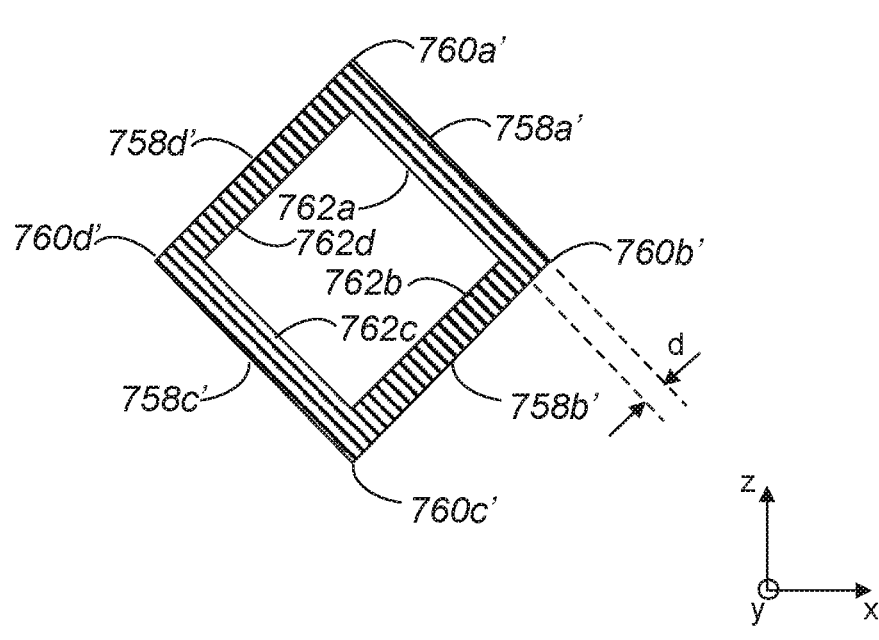
FIG. 7B is a diagrammatic representation of a second configuration of a target, e.g., target 650b of FIGS. 6A and 6B, in accordance with an embodiment.

FIG. 7B is a diagrammatic representation of a second configuration of a target, e.g., target 650*b* of FIGS. 6A and 6B, in accordance with an embodiment. Target 650*b''* has outer edges 758*a'-d'* which join at vertices 760*a'-d'* to define a substantially overall diamond outline. Target 650*b''* also includes inner edges 762*a-d* which define a hollow, or otherwise empty, space within target 650*b''*. Inner edges 762*a-d* define a substantially diamond-shaped outline that is positioned in a concentric manner with respect to the substantially overall diamond outline defined by outer edges 758*a'-d'*. As beams emitted by a lidar (not shown) may have a blooming effect when contacting a solid surface, the presence of a hollow space or area may reduce blooming. Blooming effects, as will be appreciated by those skilled in the art, may occur when light beams contact a surface. Blooming effects may cause target 650*b'* to appear larger than it actually is in a point cloud generated from data collection. The use of a hollow space or area essentially makes the detection of a vertex 760*a'-d'* more invariant in the presence of blooming effects.

The dimensions of target 650*b''* may vary widely. For example, the dimensions of target 650*b''* may vary depending upon factors including, but not limited to including, the number of beams or channels associated with a lidar that is being validated using target 650*b'* and/or a distance between the lidar and target 650*b'*. In one embodiment, the length of each outer edge 758*a'-d'* may be approximately four feet, and the length of each inner edge 762*a-d* may be approximately 3.2 feet. Thus, in such an embodiment, the width between outer edges 758*a'-d'* and inner edges 762*a'-d'*. e.g., a distance 'd' between outer edge 758*a'* and inner edge 762*a'*, may be approximately 0.4 feet. In another embodiment, the length of each outer edge 758*a'-d'* may be approximately 1.5 meters, the length of each inner edge 762*a-d* may be approximately 1.2 meters in length, and distance 'd' may be approximately 0.15 meters. In still another embodiment, the length of each outer edge 758*a'-d'* may be approximately 1.5 meters, the length of each inner edge 762*a-d* may be approximately one meter in length, and distance 'd' may be approximately 0.25 meters.

As a lidar rotates due to the rotation of a platform on which the lidar is mounted, and as components in the lidar rotate or spin while emitting beams, the lidar may effectively obtain measurements with respect to a target at different points along one or more axes of measurement. Positions of vertices of the target may be estimated with respect to each beam to substantially identify any beams or channels that do not meet specified intrinsic parameters such as channel accuracy parameters.

Figure 8A:
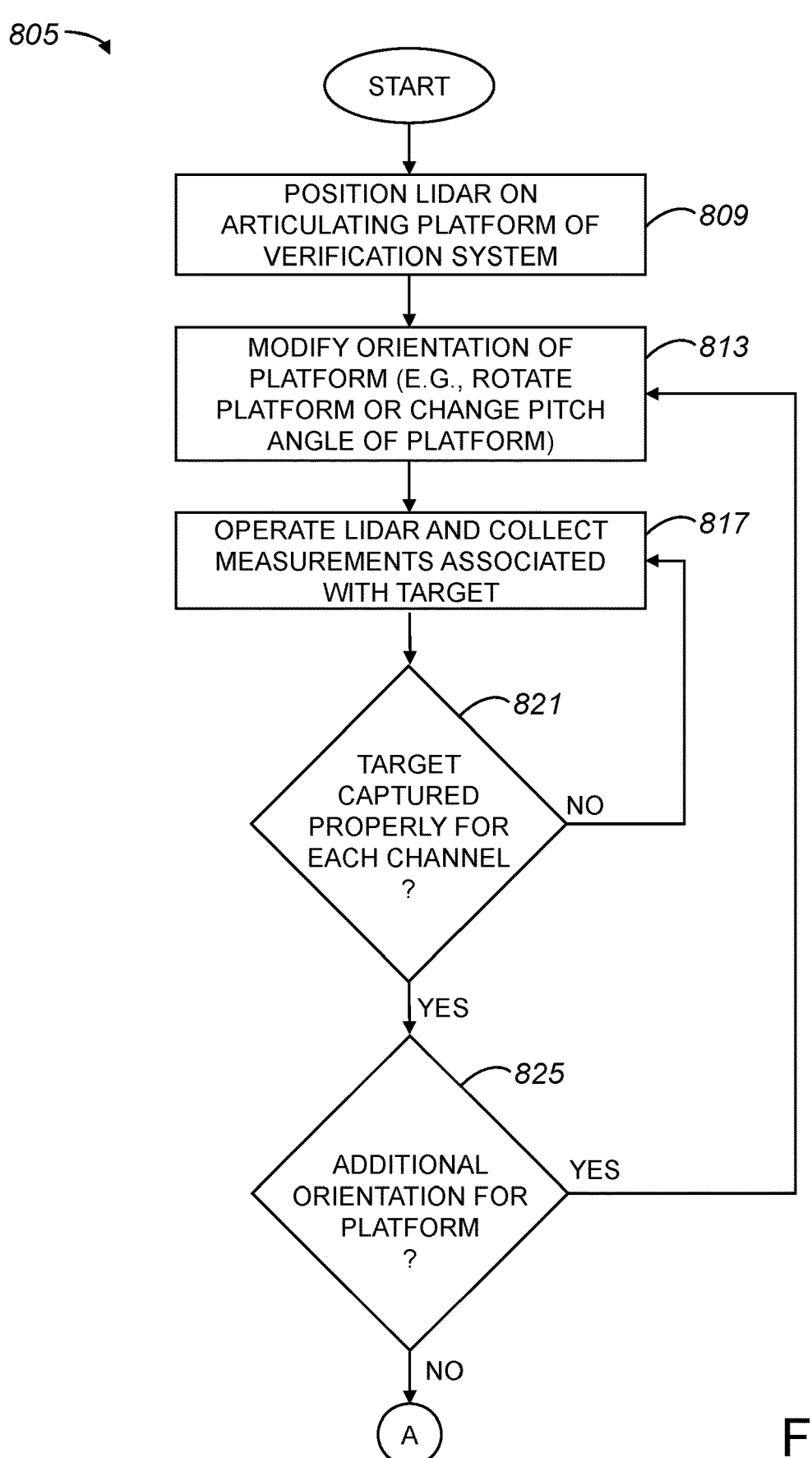
FIGS. 8A and 8B are a process flow diagram which describes a method of validating inter-channel accuracy parameters of a lidar in accordance with an embodiment.
Figure 8B:
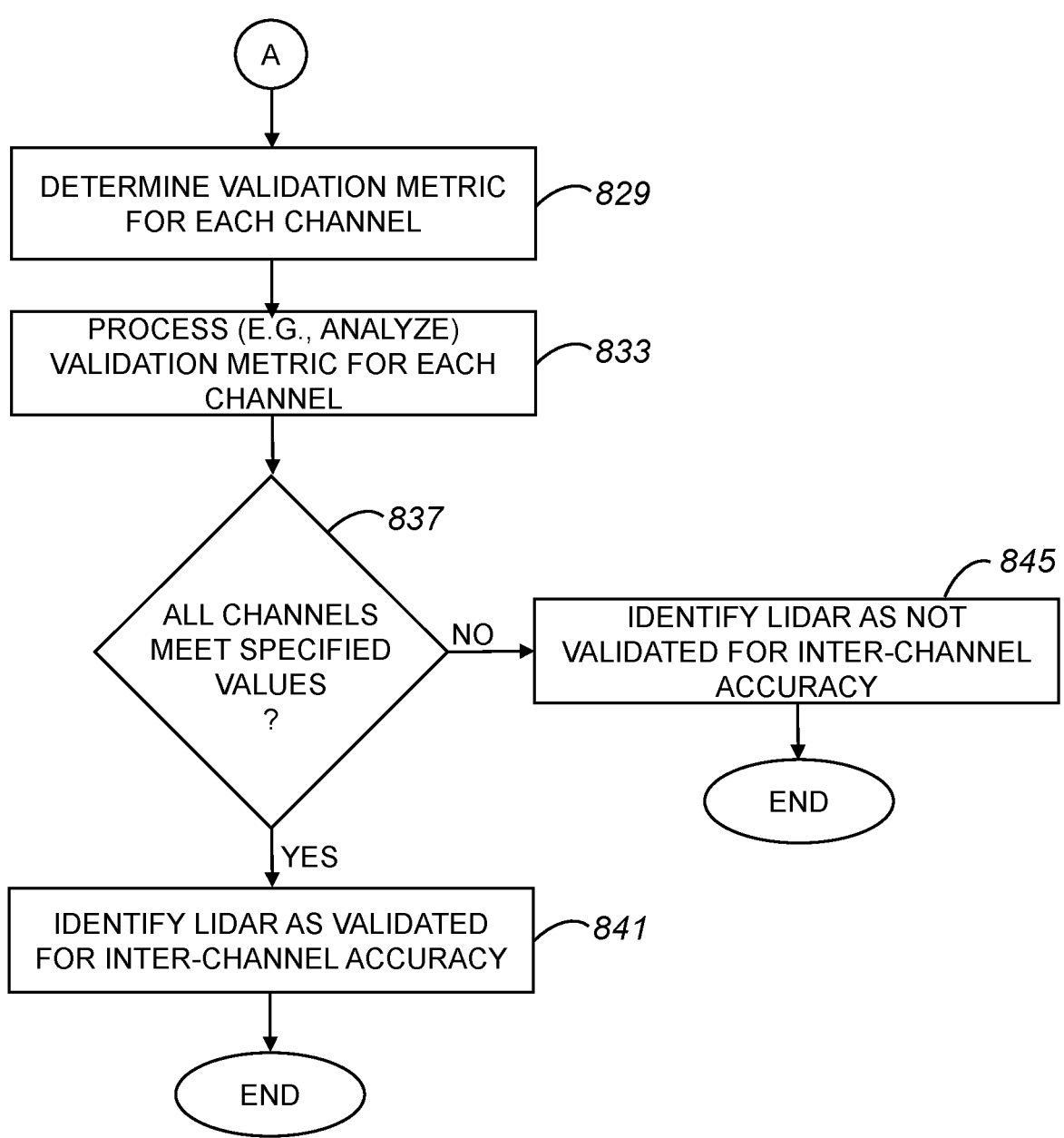

With reference to FIGS. 8A and 8B, the use of a verification system to determine whether beams or channels of a lidar may be verified as accurate will be described. FIGS. 8A and 8B are a process flow diagram which describes a method of validating inter-channel accuracy parameters of a lidar using a verification system in accordance with an embodiment. A method 805 of validating inter-channel accuracy parameters begins at a step 809 in which a lidar is positioned on an articulating platform of a verification system. Positioning the lidar may include loading the lidar onto a clamp or other mechanism that supports the lidar on the platform, and may include providing connections to the lidar for power and for data transfer.

In a step 813, the orientation of the platform may be modified. For example, the platform may be rotated and/or the pitch angle of the platform may be altered. As discussed above, when the platform rotates and/or the pitch angle of the platform changes, the lidar rotates with the platform. The amount by which the platform is rotated may be based on, but is not limited to being based on, a desired number of orientations used to determine channel accuracy.

The lidar operates and collects measurements associated with the target in a step 817. In other words, the lidar may take and collect measurements of the target, and the output of the lidar, e.g., a point cloud, may be recorded. The point cloud may be processed or otherwise analyzed to determine, in a step 821, whether the target was captured properly for each beam or channel associated with the lidar.

If the determination in step 821 is that the target was not properly captured, then process flow returns from step 821 to step 817 in which the lidar is once again operated, and measurements may once again be taken with respect to the target. Alternatively, if it is determined in step 821 that the target was captured properly for each channel, the implication is that additional measurements with the platform in its current orientation are not necessary. Accordingly, process flow moves from step 821 to a step 825 in which it is determined whether there is at least one other orientation for the platform. That is, a determination is made as to whether additional measurements or, more generally, data are to be obtained as part of a verification or validation process.

If the determination in step 825 is that there is at least one additional orientation for the platform, process flow returns to step 813 in which the orientation of the platform is modified. Alternatively, if it is determined in step 825 that there are no additional orientation for the platform, then in a step 829, a validation metric or intrinsic parameter for each channel is determined. Step 829 will be described in more detail below with respect to FIG. 9.

After a validation metric is determined or calculated for each channel, the validation metric for each channel is processed in a step 833. Processing a validation metric may include, but is not limited to including, comparing the validation metric against a desired or specified value, or a desired or specified range of values, for the validation metric. Such a comparison may involve ascertaining the accuracy of a measurement relating to an edge of a target, as made by a channel, when compared to the actual edge of the target.

Once the validation metric for each channel is processed, a determination is made in a step 837 as to whether substantially all channels of the lidar meet specified values, as for example specified channel accuracy parameters. The vertex position may be converted to an azimuth and elevation angle for each lidar beam, That is, it, is determined whether the lidar has been validated or otherwise successfully completed a verification process. As will be appreciated by those skilled in the art, the elevation angle for each beam is an intrinsic that is being calibrated or otherwise validated. The global elevation angle for each beam may be determined by comparing a vertex position on forward and backward passes relating to the positioning of a lidar when rotated on a platform, e.g., when a lidar unit is substantially upside down with a platform rotated at approximately 180 degrees. A relative azimuth angle between beams may be identified by comparing an estimated vertex position for each beam. If it is determined that substantially all channels of the lidar meet specified values, then the lidar is identified as validated for inter-channel accuracy in a step 841, and the method of validating inter-channel accuracy parameters of a lidar using a verification system is completed. On the other hand, if it is determined that substantially all channels of the lidar do not meet specified values, i.e., that one or more channels do not meet specified values, process flow proceeds from step 837 to a step 845 in which the lidar is identified as not validated for inter-channel accuracy, and the method of validating inter-channel accuracy parameters of a lidar using a verification system is completed.

Figure 9:
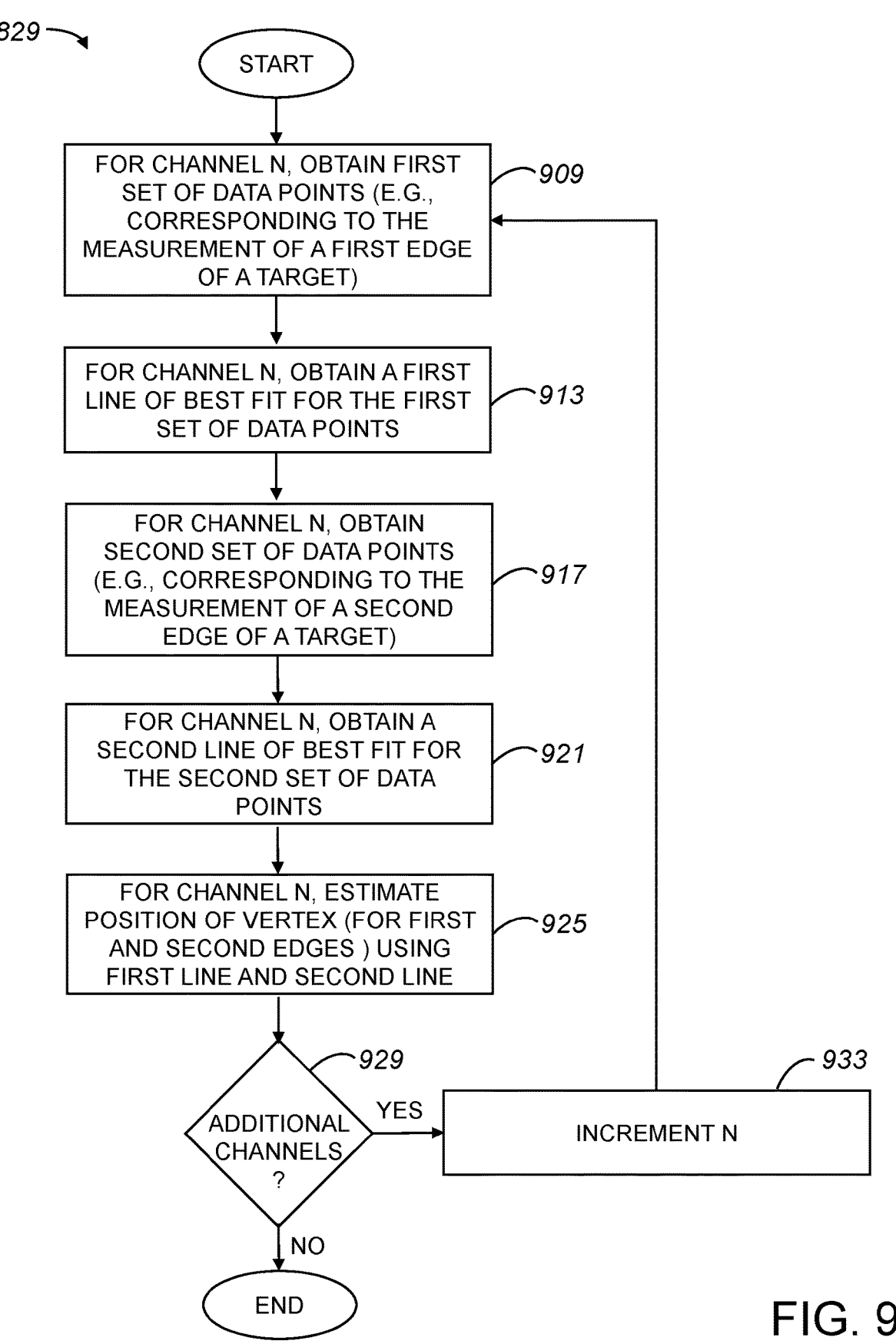
FIG. 9 is a process flow diagram which describes a method of determining a validation metric for each channel of a lidar, e.g., step 829 of FIGS. 8A and 8B, in accordance with an embodiment.

In one embodiment, a validation metric that is determined for each beam or a channel of a lidar may be a position of a vertex of a target as essentially estimated or otherwise determined based on measurements of the target by each beam or channel. A vertex is generally a point associated with two edges, e.g., a vertex may be a point at which two edges effectively meet. FIG. 9 is a process flow diagram which describes a method of determining a validation metric for each channel of a lidar, e.g., step 829 of FIGS. 8A and 8B, in accordance with an embodiment. Method 829 of determining a validation metric for each channel of a lidar begins at a step 909 in which a first set of data points associated with channel N is obtained. The first set of data points may correspond to the measurement of a first edge of a target as obtained or otherwise collected for a channel, e.g., channel N. Lines may be fit to points associated with the edge of a target, and the intersection of those lines may be identified.

Once the first set of data points is obtained, a first line of best fit for the first set of data points is obtained or otherwise identified in a step 913 for channel N. Any suitable method may be used to determine the first line of best fit. In one embodiment, generating or deriving the first line of best fit may include, but is not limited to including, substantially aggregating data from channel N or beam N at different pitch angles, identifying edge points as maximum and minimum azimuth points, projecting the edge points onto a measured plane along the direction of channel N, and fitting the projected points with a line. In one embodiment, a least squares method may be used to determine a line of best fit.

In a step 917, for channel N, a second set of data points that correspond to the measurement of a second edge of the target is obtained for channel N. Using the second set of data points, a second line of best fit for the second set of data points is obtained in a step 921 for channel N.

Using the first and second lines of best fit, a position or location of a vertex associated with the first and second edges may be estimated in a step 925. In one embodiment, the estimated location of the vertex may be a parameter, as for example a validation metric, used to assess the accuracy of channel N.

From step 925, process flow moves to a step 929 in which it is determined whether there are additional channels for which a position of a vertex is to be estimated. If the determination is that there are additional channels to process, then process flow moves to a step 933 in which N is effectively incremented. It should be appreciated that the number of channels to process may correspond to the number of active channels associated with a lidar. In one embodiment, a lidar may have sixty-four channels, although the number of channels may vary widely. From step 933, process flow returns to step 909 in which a first set of data points is obtained for channel N. Alternatively, if it is determined in step 929 that there are no additional channels to process, then the method of determining a validation metric for each channel of a lidar is completed.

Figure 10:
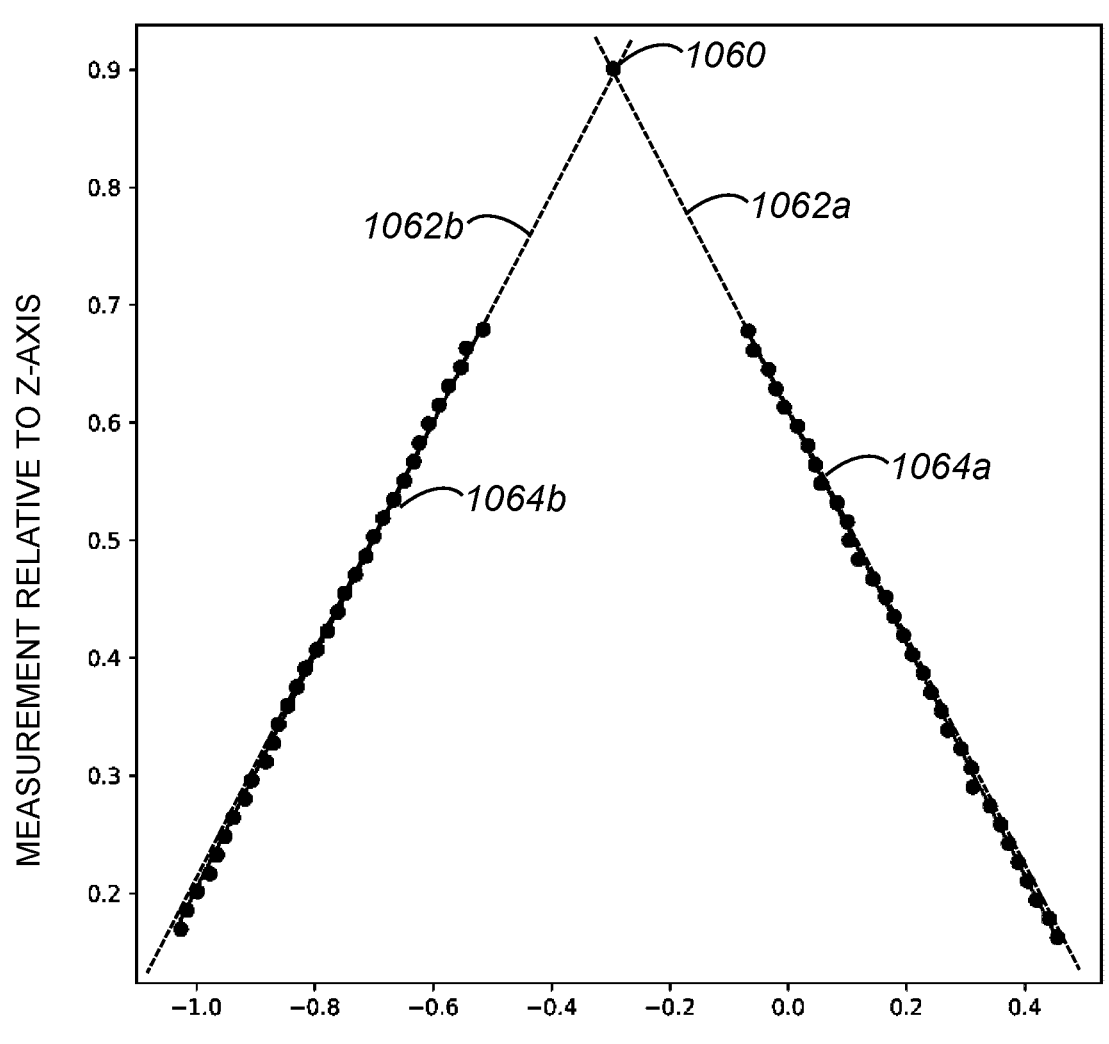
FIG. 10 is a diagrammatic representation of data points associated with a lidar beam or channel as measured with respect to edges of a target in accordance with an embodiment.

With reference to FIG. 10, the estimation of the location of a vertex of a target will be described in accordance with an embodiment, FIG. 10 is a diagrammatic representation of data points associated with a lidar beam or channel as measured with respect to edges of a target in accordance with an embodiment. A chart 1066 includes a first set of data points 1068a collected by a channel and associated with a first edge of a target. Chart 1066 also includes a second set of data points 1068b collected by the channel and associated with a second edge of a target. A first best fit line 1064*a* may be generated to fit data points 1068*a*, and a second best fit line 1064*b* may be generated to fit data points 1068*b*. A point 1068 at which best fit lines 1064*a*, 1064*b* intersect may be identified as an estimated vertex of a target.

Figure 11:
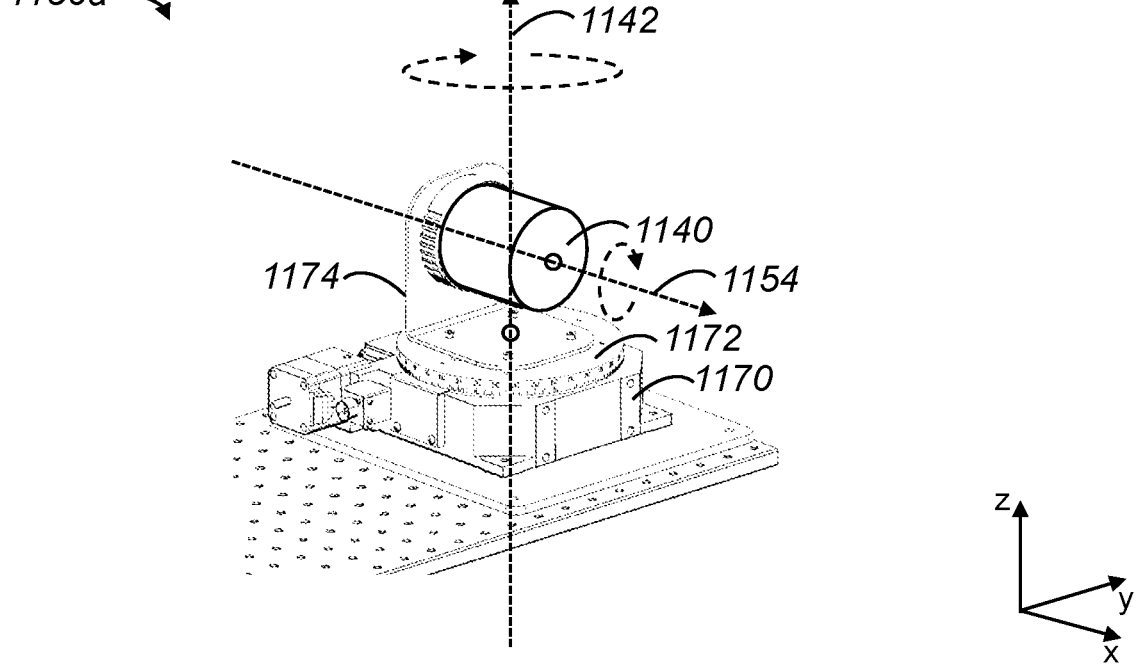
FIG. 11 is a diagrammatic representation of an articulating platform arrangement in accordance with an embodiment.

FIG. 11 is a diagrammatic representation of an articulating platform arrangement that is part of a verification system in accordance with an embodiment. In one embodiment, an articulating platform arrangement 1150*a* includes a base 1170 that is arranged to support a platform 1172. Platform 1172 is configured to rotate about a vertical axis 1142, as for example to rotate to different pivot angles. A lidar support 1174 is positioned on platform 1172, and is generally arranged to support a lidar 1140 during a verification process. During a verification process, components within lidar 1140 spin about a horizontal axis 1154 and emit beams.

Figure 12:
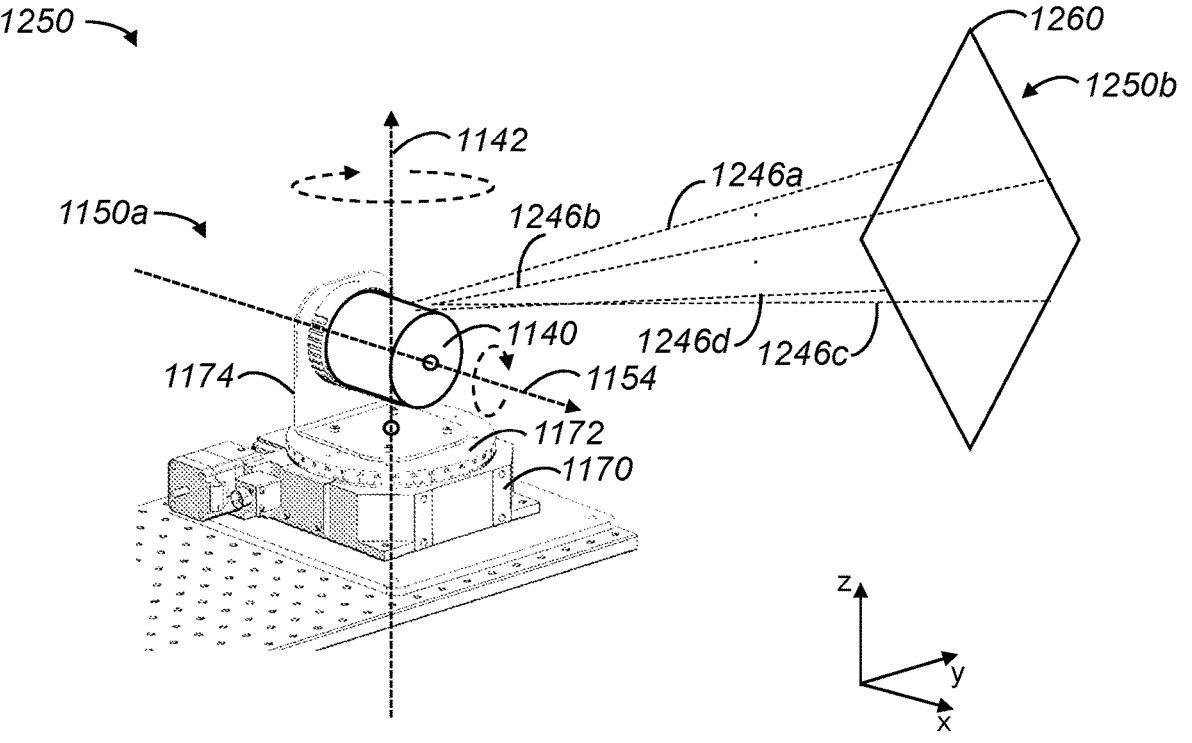
FIG. 12 is a diagrammatic representation of a verification system that includes an articulating platform arrangement, e.g., articulating platform arrangement 1150a of FIG. 11, in accordance with an embodiment.

With reference to FIG. 12, the use of articulating platform arrangement 1150*a* will be described in accordance with an embodiment. FIG. 12 is a diagrammatic representation of a verification system that includes articulating platform arrangement 1150*a* in accordance with an embodiment. A verification system 1250 includes platform arrangement 1150*a* and a target 1250*b* that is positioned at a distance from platform arrangement 1150*a* relative to an x-axis.

Channels or beams 1246*a-d* originating from lidar 1140 may effectively hit or contact edges of target 1250*b* and, hence, enables particular channels 1246*a-d* to measure target 1250*b* at points on target 1250*b*, e.g., points on edges of target 1250*b*. As platform 1172 rotates or spins, particular channels 1246*a-d* may measure target 1250*b* at different points on target 1250*b*, as for example points along a line relative to an x-axis. A position of a vertex 1260 of target 1250*b* may be estimated or otherwise derived with respect to a particular channel 1246*a-d*, and a relative channel accuracy may be determined for each channel 1246*a-d* relative to other channels 1246*a-d*.

Figure 13A:
FIG. 13A is a diagrammatic first side view representation of a beam or channel verification system that includes a tilting platform in accordance with an embodiment.
Figure 13A:
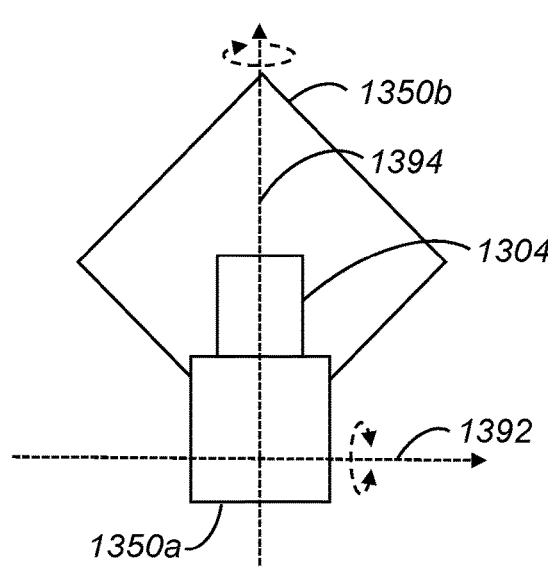
Figure 13A:
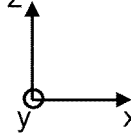
Figure 13B:
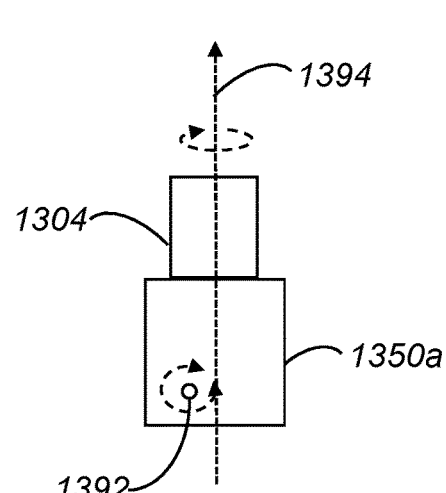
FIG. 13B is a diagrammatic second side view representation of a beam or channel verification system that includes a tilting platform in accordance with an embodiment.
Figure 13B:
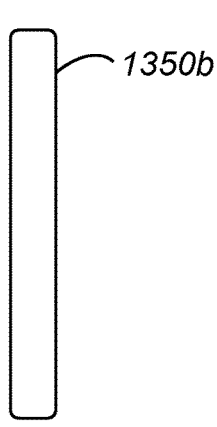
Figure 13B:
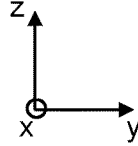

In lieu of a verification system including an articulating platform that rotates with respect to a vertical axis, a verification system may instead include an articulating platform that pivots or tilts with respect to a horizontal axis. Referring next to FIGS. 13A and 13B, a verification system that includes a platform that pivots with respect to a horizontal axis in accordance with an embodiment. A verification system 1350 includes an articulating platform 1350*a* that is configured to support a lidar 1304. Components within lidar 1304 are configured to rotate or spin about an elevation axis 1394 which is defined through a center of lidar 1304. In the embodiment as shown, elevation axis 1394 is a z-axis when platform 1350*a* is not tilted.

Platform 1350*a* is configured to pivot or tilt about a horizontal axis 1392. As platform 1350*a* pivots about axis 1392, lidar 1304 may effectively pivot about axis 1392 while components within lidar 1304 rotate about axis 1394. As components within lidar 1304 rotate, beams or channels (not shown) may be projected onto a target 1350*b* and measured. Platform 1350*a* may pivot about axis 1392 such that desired angles, e.g., pitch angles, at which data is to be collected for verification purposes may be achieved. In general, an axis of rotation of platform 1350*a* may be orthogonal to an axis of rotation of lidar 1304.

Although only a few embodiments have been described in this disclosure, it should be understood that the disclosure may be embodied in many other specific forms without departing from the spirit or the scope of the present disclosure. By way of example, while a distribution of beams or channels associated with a rotating or spinning lidar has been described as including approximately sixty-four beams, the number of beams in a distribution may vary widely. Fewer than approximately sixty-four beams, or more than approximately sixty-four beams, may be included in a distribution.

The overall shape of a target may vary widely and, as mentioned above, may include edges which connect or otherwise join at a vertex, peak, or apex. Additionally, the size and configuration of a target may also vary widely. For instance, while a target has been described as being substantially diamond shaped with respect to a plane and having sides or edges that are approximately the same length, a target may be of any shape and may have sides that have different lengths.

Steps associated with positioning a lidar on an articulating platform and modifying the orientation of the platform may be performed by a computing system configured to control a lidar positioning modification mechanism. Such a computing system may provide commands to a controller of a lidar positioning modification mechanism to trigger or to otherwise cause a lidar to take measurements and to analyze a point cloud generated by the lidar. The computing system may be further configured to determine when the lidar is properly oriented and, in response to determining that the lidar is properly oriented, to transmit commands or messages to the lidar to trigger or to otherwise cause the lidar to take measurements of a target. In addition, a computing system may be configured to analyze the output of a lidar, and to determine whether the lidar properly captured the target.

An autonomous vehicle has generally been described as a land vehicle, or a vehicle that is arranged to be propelled or conveyed on land. It should be appreciated that in some embodiments, an autonomous vehicle may be configured for water travel, hover travel, and/or air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:

positioning a lidar on a platform, the lidar having at least one associated specification, the platform being arranged to rotate about a first axis, wherein when the platform rotates about the first axis, the lidar rotates about the first axis;

measuring at least a first data point, the at least first data point being associated with a first channel of the lidar when the platform is oriented at a first pitch angle, wherein the at least first data point is measured with respect to a target, the target having at least a first edge, a second edge, and a vertex at which the first edge meets the second edge;

measuring at least a second data point, the at least second data point being associated with the first channel of the lidar when the platform is oriented at a second pitch angle, wherein the at least second data point is measured with respect to the target;

processing the at least first data point and the at least second data point to identify a first estimated location of the vertex; and determining whether the first estimated location of the vertex meets the specification, wherein when it is determined that the first estimated location of the vertex meets the specification, the lidar is verified.

2. The method of claim 1 wherein when it is determined that the first estimated location of the vertex does not meet the specification, the lidar is not verified.

3. The method of claim 1 wherein processing the at least first data point and the at least second data point to identify the first estimated location of the vertex includes:

aggregating data associated with the first channel, the data including the at least first data point and the at least second data point; and fitting a plurality of best fit lines to the aggregated data, wherein the first estimated location of the vertex is a point at which the plurality of best fit lines meets.

4. The method of claim 1 further including:

measuring at least a third data point, the at least third data point being associated with a second channel of the lidar when the platform is oriented at the first pitch angle, wherein the at least third data point is measured with respect to the target;

measuring at least a fourth data point, the at least fourth data point being associated with the second channel of the lidar when the platform is oriented at the second pitch angle, wherein the at least fourth data point is measured with respect to the target;

processing the at least third data point and the at least fourth data point to identify a second estimated location of the vertex; and determining whether the second estimated location of the vertex meets the specification, wherein when it is determined that the second estimated location of the vertex meets the specification, the lidar is verified.

5. The method of claim 1 wherein the lidar has an elevation axis, and positioning the lidar on the platform includes aligning the elevation axis with respect to a second axis, the second axis being perpendicular to the first axis.

6. The method of claim 5 wherein the first axis is a vertical axis and the second axis is a horizontal axis.

7. Logic encoded in one or more tangible non-transitory, computer-readable media for execution and when executed operable to:

measure at least a first data point, the at least first data point being associated with a first channel of a lidar positioned on a platform that is oriented at a first pitch angle, wherein the at least first data point is measured with respect to a target, the target having at least a first edge, a second edge, and a vertex at which the first edge meets the second edge;

measure at least a second data point, the at least second data point being associated with the first channel of the lidar when the platform is oriented at a second pitch angle, wherein the at least second data point is measured with respect to the target;

process the at least first data point and the at least second data point to identify a first estimated location of the vertex; and determine whether the first estimated location of the vertex meets the specification, wherein when it is determined that the first estimated location of the vertex meets the specification, the lidar is identified as verified.

8. The logic of claim 7 wherein when it is determined that the first estimated location of the vertex does not meet the specification, the lidar is identified as not verified.

9. The logic of claim 7 wherein the logic operable to process the at least first data point and the at least second data point to identify the first estimated location of the vertex includes logic operable to:

aggregate data associated with the first channel, the data including the at least first data point and the at least second data point; and fit a plurality of best fit lines to the aggregated data, wherein the first estimated location of the vertex is a point at which the plurality of best fit lines meets.

10. The logic of claim 7 further including logic operable to:

measure at least a third data point, the at least third data point being associated with a second channel of the lidar when the platform is oriented at the first pitch angle, wherein the at least third data point is measured with respect to the target;

measure at least a fourth data point, the at least fourth data point being associated with the second channel of the lidar when the platform is oriented at the second pitch angle, wherein the at least fourth data point is measured with respect to the target;

process the at least third data point and the at least fourth data point to identify a second estimated location of the vertex; and determine whether the second estimated location of the vertex meets the specification, wherein when it is determined that the second estimated location of the vertex meets the specification, the lidar is identified as verified.

11. The logic of claim 7 wherein the lidar has an elevation axis, and the logic operable to position the lidar on the platform is further operable to align the elevation axis with respect to a second axis, the second axis being perpendicular to a first axis.

12. The logic of claim 11 wherein the first axis is a vertical axis and the second axis is a horizontal axis.

13. An apparatus comprising:

a platform, the platform configured to support a lidar and to rotate about a first axis;

a target, the target being positioned at a distance away from the platform, the target including a first edge, a second edge, and a vertex, the vertex being a point at which the first edge and the second edge meet; and a verification system, the verification system configured to process measurements obtained from the lidar supported by the platform with respect to the verification system for each channel of a plurality of channels associated with the lidar, wherein the verification system is configured to process the measurements to obtain at least one estimated parameter for the lidar and to determine whether, based at least on the at least one estimated parameter, the channel meets a channel accuracy metric.

14. The apparatus of claim 13 wherein the target is a polygon, and wherein the first edge is a first side of the polygon and the second edge is a second side of the polygon.

15. The apparatus of claim 14 wherein the polygon has a diamond shape.

16. The apparatus of claim 15 wherein the polygon has a hollow diamond shape.

17. The apparatus of claim 13 wherein the verification system is configured to cause the platform to rotate, wherein the verification system causes the platform to rotate to a first pitch angle and wherein the measurements include a first set of data points associated with the first pitch angle.

18. The apparatus of claim 17 wherein the verification system causes the platform to rotate to a second pitch angle and wherein the measurements include a second set of data points associated with the second pitch angle.

19. The apparatus of claim 13 wherein the platform is configured to support the lidar such that an elevation of the lidar is aligned along a second axis, the second axis being approximately perpendicular to the first axis.

20. The apparatus of claim 19 wherein the first axis is a vertical axis and the second axis is a horizontal axis.

\* \* \* \* \*